United States Patent [19]

Satoh et al.

[11] 4,426,693
[45] Jan. 17, 1984

[54] LIGHT SOURCE INTENSITY CONTROL IN AN OPTICAL RECORDING AND REPRODUCING APPARATUS

[75] Inventors: Isao Satoh, Neyagawa; Tomio Yoshida, Katano; Shunji Harigae, Neyagawa; Kenji Koishi, Suita, all of Japan

[73] Assignee: Matsushita Electric Industrial Co., Ltd., Osaka, Japan

[21] Appl. No.: 288,915

[22] Filed: Jul. 31, 1981

[30] Foreign Application Priority Data

Aug. 7, 1980 [JP] Japan ................................ 55-108945

[51] Int. Cl.$^3$ .............................................. G11B 7/00
[52] U.S. Cl. ...................................... 369/45; 369/116
[58] Field of Search ............... 369/106, 111, 116, 275, 369/45, 50, 32, 33, 41; 365/234; 360/32

[56] References Cited

U.S. PATENT DOCUMENTS

| | | | |
|---|---|---|---|
| 4,057,831 | 11/1977 | Jacobs et al. | 369/275 |
| 4,321,635 | 3/1982 | Tsuyuguchi | 369/32 X |
| 4,325,135 | 4/1982 | Dil et al. | 369/111 X |
| 4,328,506 | 5/1982 | Yoshida et al. | 369/116 X |

FOREIGN PATENT DOCUMENTS

| | | | |
|---|---|---|---|
| 52-66314 | 6/1977 | Japan | 369/111 |
| 54-116901 | 9/1979 | Japan | 369/111 |

*Primary Examiner*—Bernard Konick
*Assistant Examiner*—Donald McElheny, Jr.
*Attorney, Agent, or Firm*—Stevens, Davis, Miller & Mosher

[57] ABSTRACT

An optical information recording and reproducing apparatus for optically recording and reproducing information on and from a disk-shaped information carrier having a guide track is disclosed. A digital track address prerecorded on the guide track is reproduced and the intensity of a recording laser beam is controlled by the reproduced digital track address so that the exposures of the recording laser beam at an inner periphery and an outer periphery of the disk-shaped information carrier rotated at a constant rotation speed are corrected to enable an optimum recording over an entire surface of the disk-shaped information carrier.

2 Claims, 16 Drawing Figures

(A) WRITE COMMAND (b)
(B) GUIDE TRACK
(C) ADDRESS SIGNAL (a)
(D) ADDRESS END SIGNAL (c)
(E) WRITE ENABLE SIGNAL (d)
(F) LASER OUTPUT

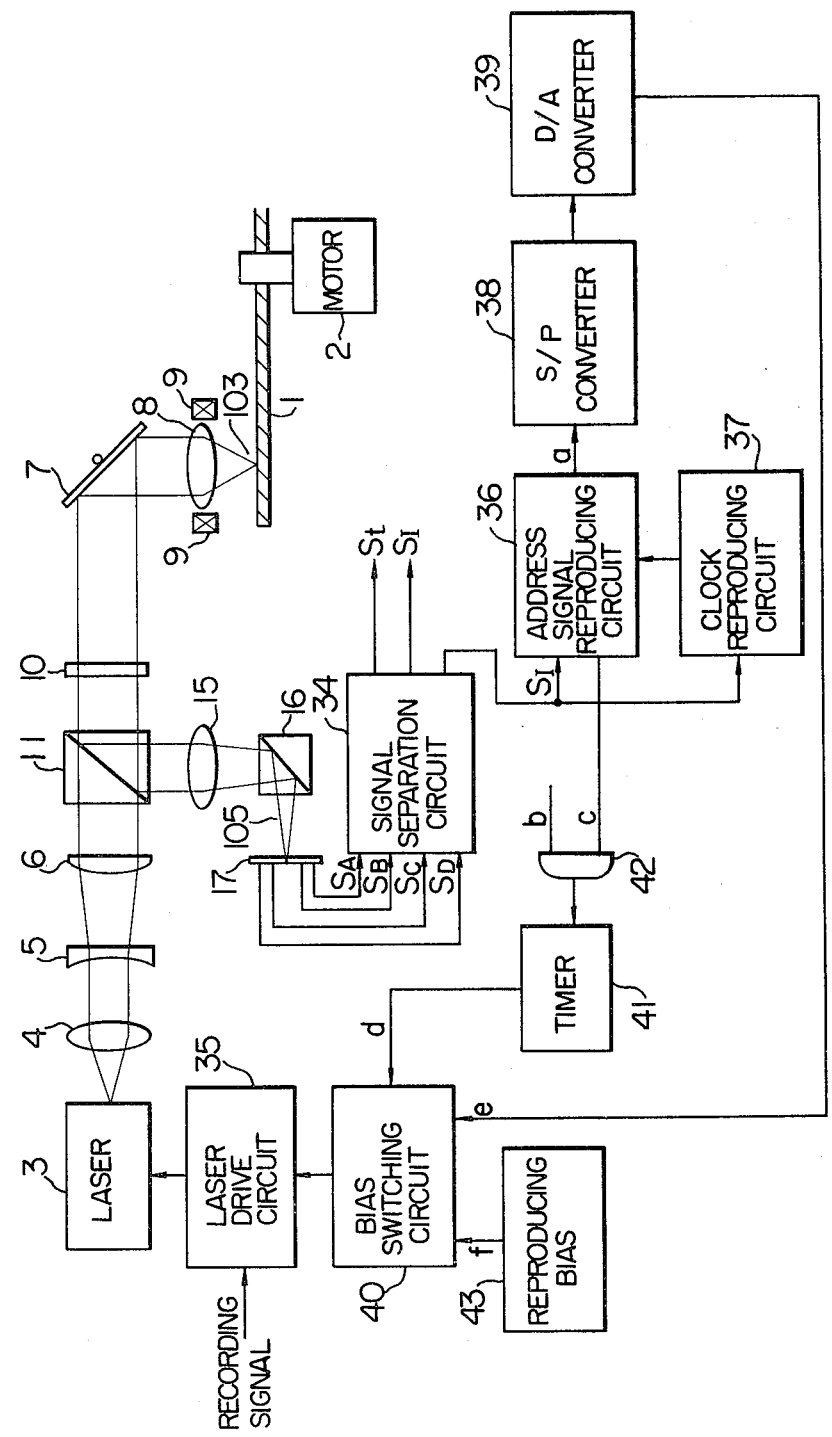

4,426,693

LIGHT SOURCE INTENSITY CONTROL IN AN OPTICAL RECORDING AND REPRODUCING APPARATUS

BACKGROUND OF THE INVENTION

The present invention relates to an optical recording and reproducing apparatus for optically recording and reproducing information on and from a disk-shaped information carrier having a guide track, and more particularly to an optical recording and reproducing apparatus which controls an intensity of a recording light beam of a laser light source by an address signal of the guide track.

An optical information recording and reproducing apparatus has been proposed, in which a disk-shaped information carrier having photo-sensitive material applied or vapor-deposited thereon is rotated, a light beam from a laser light source which is converged to a small spot of a diameter of approximately 1 $\mu$m is irradiated to the disk-shaped information carrier, an intensity of a light output therefrom is modulated with a recording signal to record information such as a video signal or a digital signal on the information carrier in real time as a change of an optical characteristic such as change of phase due to unevenness, change of index of refraction, change of reflection factor or change of transmission factor, and the recorded information is reproduced by detecting the change of the optical characteristic.

In such an apparatus, in order to allow a high density of recording tracks and partial writing or erasing of discrete tracks, it has been proposed to provide cocentric guide tracks or a spiral guide track for guiding the recording tracks, and the information is recorded or reproduced on or from a selected track while tracking control is effected so that the recording track follows the guide track.

The disk-shaped information carrier can store the information in a form which permits optical recording and reproducing and has the guide track to guide the information to the recording surface. The information is recorded and reproduced by optically tracking the guide track and producing an electrical signal which causes a small writing spot light to follow and focus to the guide track. The guide track has a phase structure which presents a phase change to the small spot light impinged to the information carrier. A disk having a guide track of phase structure is disclosed in IEEE Spectrum, Vol. 16, No. 8, p. 26, in which the guide track has a groove depth of one eighth of a wavelength, a low melting point metal such as Te is vapor-deposited on the groove, and address information is recorded in the same groove at a depth of one quarter of the wavelength. The information is written on the disk by forming holes by evaporating the low melting point metal by thermal energy of the small spot light.

SUMMARY OF THE INVENTION

It is an object of the present invention to provide an optical information recording and reproducing apparatus in which the guide track has a phase structure such as an uneven groove or geometric variations in the groove, an address signal prerecorded on the phase structure is reproduced and an intensity of a recording laser beam is controlled by the reproduced address signal so that exposures of laser beam irradiation at an inner periphery and an outer periphery of the disk-shaped information carrier which rotates at a constant rotation speed is corrected.

The above and other objects of the present invention will be clear from the following detailed description of the preferred embodiments.

BRIEF DESCRIPTION OF THE DRAWINGS

FIG. 7 shows a configuration of one embodiment of the present invention.

DESCRIPTION OF THE PREFERRED EMBODIMENTS

Figure 1:
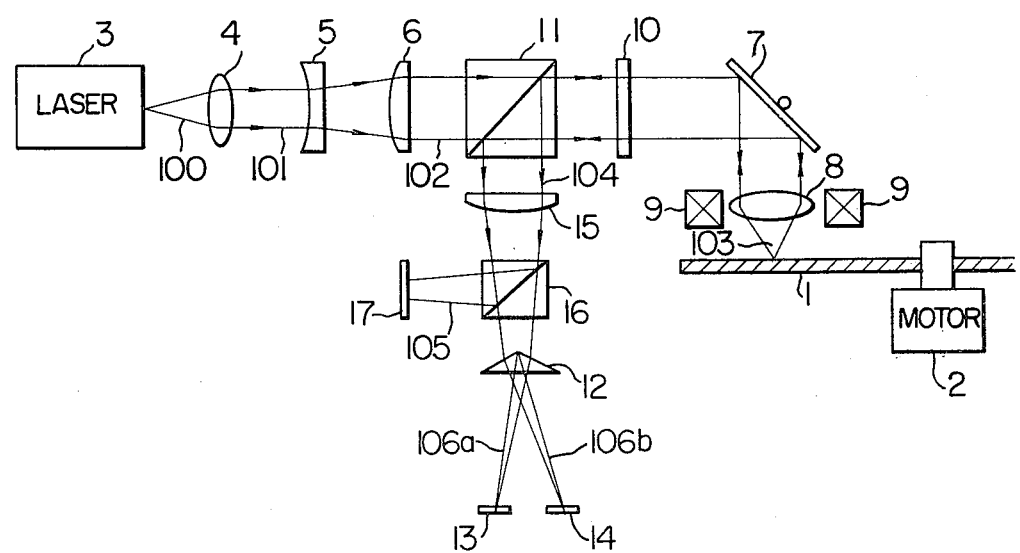
FIG. 1 shows a schematic diagram of an optical information recording and reproducing apparatus.

FIG. 1 shows a configuration of an optical information recording and reproducing apparatus for recording and reproducing information. A reflection type disk-shaped information carrier 1 having a guide track formed therein is rotated at a constant rotating speed by a motor 2 and transported radially. A laser light source 3 may be a semiconductor laser and a light beam 100 emitted from the laser light source 3 is collimated to a collimated beam 101 by a condenser lens 4. Lenses 5 and 6 are concave and convex anamophic lenses for correcting distributions of pattern emitting from the semiconductor laser which distributions differ from direction to direction of a junction plane. They serve to enlarge the light beam which is parallel to the junction plane of the semiconductor laser into a circular collimated beam 102. The circular collimated beam 102 is reflected by a tracking mirror 7 toward the guide track and converged by a converging lens 8 to a small spot light 103 in the order of 1 $\mu$m in diameter on the surface of the reflection type disk-shaped information carrier 1. A converging lens driver 9 which resembles a voice coil of a speaker finely moves the converging lens 8 vertically in response to a fluctuation in a level of the surface of the reflection type disk-shaped information carrier 1 so that the small spot 103 is always focused on the reflection type disk-shaped information carrier 1. The light reflected from the reflection type disk-shaped information carrier 1 has its polarized wave plane rotated by 90 degrees with respect to the circular collimated beam 102 by a one-quarter wavelength plate 10 so that an optical path thereof can be split and changed by a polarized beam splitter 11. As is disclosed in Japanese Patent Laid-Open specification No. 54-140533, a focusing error by a reflected beam 104 split by the polarized beam splitter 11 is detected by disposing an optical wedge 12 in an optical path of the reflected light and detecting positions of the light beam by light detectors 13 and 14 disposed behind the optical wedge 12, a lens 15 serves to focus an image at an output aperture of the converging lens 8 onto the optical wedge 12. The reflected beam 104 is split by the optical wedge 12 into two multi-beams 106a and 106b, which are focused to the light detectors 13 and 14, respectively. If the small spot light 103 is defocused, the beams 106a and 106b move oppositely to each other on the light detectors 13 and 14. By detecting the displacement, a focusing error signal is produced.

Reading of the information and the detection of a tracking error of the guide track are carried out by a beam splitter 16 and a light detector 17 which receives a beam 105 reflected from the guide track of the reflection type disk-shaped information carrier 1 to which the small spot light 103 is irradiated. The reflected beam 103 is a far field pattern of the small spot light 103 reflected by the guide track. The light detector 17 comprises at least two sub-detectors which detect a positional deviation between the guide track and the small spot light and information recorded on the guide track in the form of a change of phase and change of reflection factor.

In recording the information, the converging lens driver 9 is driven by the focusing error signal detected by the light detectors 13 and 14 to automatically focus to the guide track, and the tracking mirror is deflected by the tracking error signal detected by the light detector 17 to track the guide track so that the small spot light always irradiates the guide track and the intensity of the light beam 100 of the laser light source 3 is modulated with the information. The recording media applied to the guide track stores the information in the form of change of reflection factor or change of density by the irradiation of the small spot light 103.

Figure 2A:
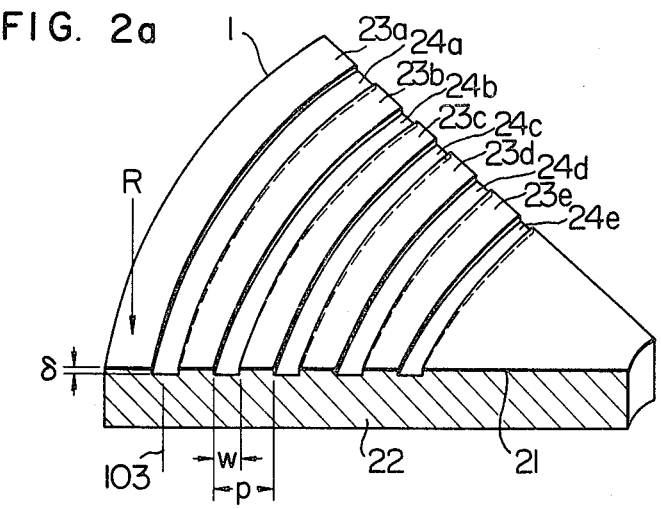
FIGS. 2a to 2c show structures of guide tracks formed in a disk-shaped information carrier.
Figure 2B:
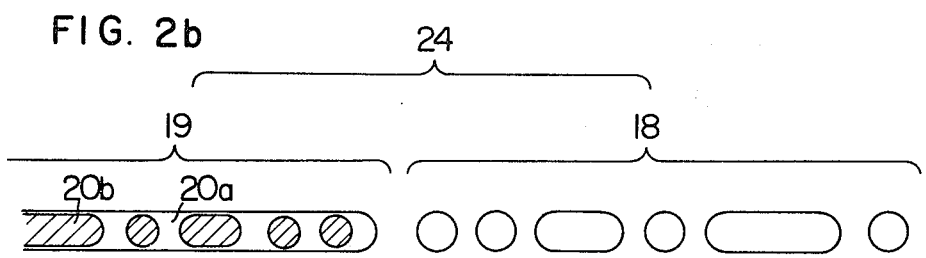
Figure 2C:
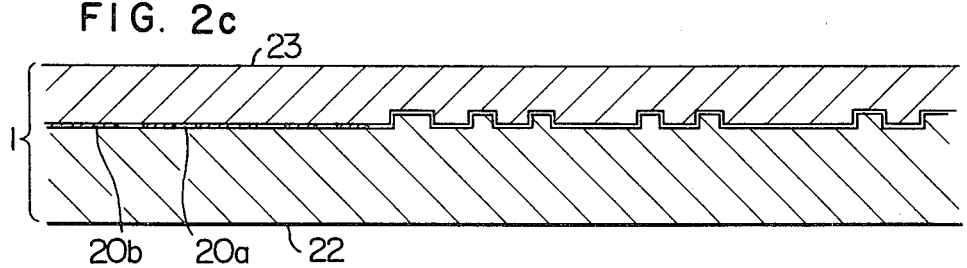

FIGS. 2a to 2c show one embodiment of a structure of the information carrier 1 to which the optical recording and reproducing apparatus of the present invention is applied. FIG. 2a shows a portion of the disk of the information carrier 1, in which a surface R of the disk of the information carrier has concentric or spiral guide track grooves 24a to 24e having a width w, pitch p and depth $\delta$. Numerals 23a to 23e denotes groove-to-groove spacings. Photo-sensitive recording material is applied on the surface R to form a recording surface 21. While not shown in FIG. 2a, a protective layer, etc. is formed on the recording surface 21. The recording small spot light 103 is irradiated from a plane of a substrate 22 as shown in FIG. 2 to focus the small spot on the surface R. Specific values of the width w, pitch p and depth of the guide track 24a to 24e may be selected such that the width w=0.6 μm, the pitch p=1.6 μm and the depth $\delta$ $\delta$=1000Å (optical path length of one eighth of the light wavelength of the laser light source 3).

FIG. 2b shows a plan view of the guide tracks and FIG. 2c shows a sectional view thereof. The guide tracks each comprises intermittent information area 18 in which address information numerical values of which sequentially increase in a predetermined sequence and control information such as sensitivity characteristic of the disk-shaped information carrier 1 are prerecorded, and information region 19 having amplitude recording material applied thereon. The guide tracks each have a grooved structure having a depth $\delta$ and the information region 18 stores the information in the form of pit structure having discretely changing optical phases.

On the other hand, the information region 19 has a continuous groove structure having the depth $\delta$ and the information is stored in the form of density. Unexposed area 20a has a higher density than an exposed area 20b and hence has a higher reflection factor.

The depth $\delta$ of the groove structure is selected to the order of one eighth of the light wavelength $\lambda$ of the laser light source 3 with the phase difference which can be followed by a change in a far field pattern. That is, $\delta = \lambda/8n$ where n is an index of refraction of the substrate 22. A substrate 23 is a protective layer which protects the guide tracks from damage and dust.

Figure 3:
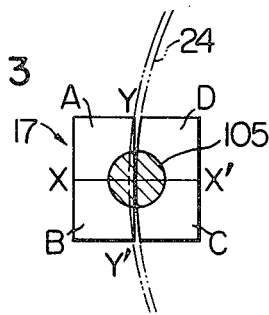
FIG. 3 shows a configuration of a light detector.

FIG. 3 shows an arrangement of the light detector 17 and the guide track 24. The light detector 17 is divided into four sections A to D. When the guide track 24 is at a focusing point and there is no radial offset with respect to the small spot 103, the center of the light detector 17 coincides with the center of the reflected beam 105. A dividing line X—X' of the light detector 17 is perpendicular to the guide track 24.

Figure 4D:
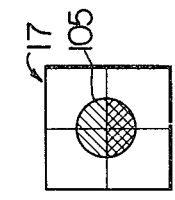
FIGS. 4a to 4d illustrate distributions on the light detector of beams reflected from the guide tracks.
Figure 4C:
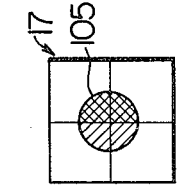
Figure 4B:
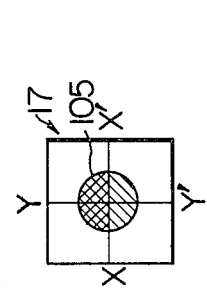
Figure 4A:
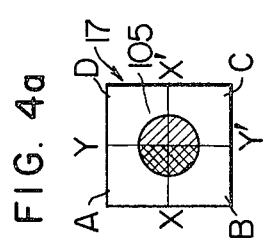

FIGS. 4a to 4d show distribution of the reflected beam 105 on the light detector 17. FIGS. 4a and 4b show the distribution of the reflected beam 105 when the small spot light 103 is offset in position with respect to the guide track 24. The light distribution is locallized perpendicularly to the guide track 24 by detracking.

When the small spot light 103 is located at a step of the guide track 24, the reflected light is deflected by a phase retardation due to the step and the light distribution in the far field becomes nonuniform. Since the directions of deflection of the reflected beam at the opposite ends of the guide track are different, a tracking control can be effected such that the small spot light 103 is positioned within the guide track 24. From FIGS. 4a and 4b and FIG. 5, a tracking error signal $S_t$ is given by:

$$S_t = (S_A + S_B) - (S_C + S_D) \qquad (1)$$

where $S_A$, $S_B$, $S_C$ and $S_D$ are output signals of the sections A to D of the light detector 17 of FIG. 3.

FIGS. 4c and 4d show the reflection beam 105 derived from the information recorded in the form of phase change of the information area 18 stored in the guide track 24. In this case, the light distribution of the reflected beam 105 is locallized in the direction of a dividing line Y—Y' of the light detector 17 which is tangential to the guide track 24. Accordingly, a readout signal $S_I$ from the information region 18 is given by:

$$S_I = (S_A + S_P) - (S_B + S_C) \qquad (2)$$

Figure 5:
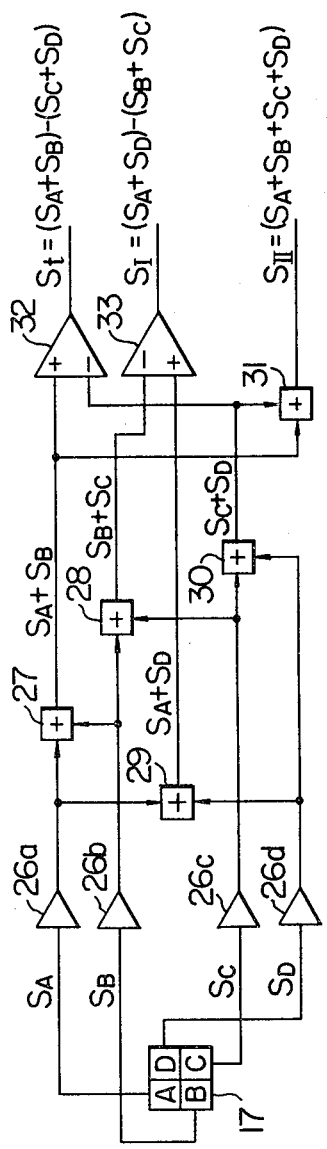
FIG. 5 shows a block diagram of a circuit for reproducing a signal from the output of the light detector.

FIG. 5 shows a block diagram of a circuit for reproducing the tracking error signal $S_t$, the readout signal $S_I$ of the information region 18 and a readout signal $S_{II}$ of the information region 19 from the output signals $S_A$-$S_D$ of the light detector 17. The output signals $S_A$-$S_D$ of the light detector 17 are amplified by preamplifiers 26a-26d. The output signals $S_t$, $S_I$ and $S_{II}$ are reproduced by summing amplifiers 27-31 and subtracting amplifiers 32 and 33. The information stored in the information region 19 of the guide track 24 in the form of change of reflection factor can be read out as a change in total light amount of the reflected beam 105. The readout signal $S_{II}$ is given by:

$$S_{II} = S_A + S_B + S_C + S \qquad (3)$$

Figure 6:
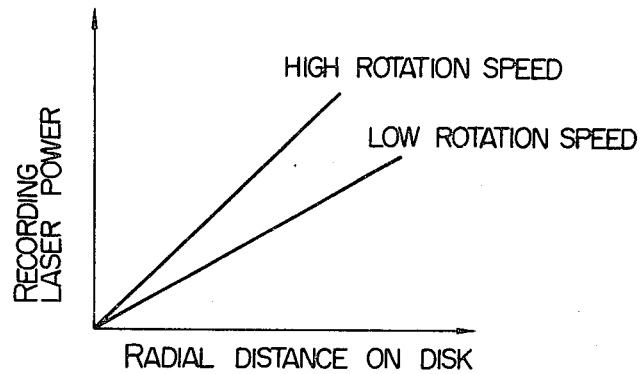
FIG. 6 shows a characteristic chart illustrating a relation between a radial track position on the disk-shaped information carrier and a recording laser power.

The disk-shaped information carrier 1 rotated at a constant rotating speed has different circumferential speeds at an inner periphery and an outer periphery of the disk. This means that different laser power is required depending on a radial position of the information carrier 1 when a signal of a given frequency is to be recorded. FIG. 6 shows a change of the recording laser power relative to the radial position of the disk-shaped information carrier 1. The radius of the disk-shaped information carrier 1 is one-to-one related to the address of the guide track.

In the present invention, the address signal prerecorded on the guide track of the information carrier 1 is read and the laser output power of the laser light source 3 is controlled by the address signal to enable high quality of recording. That is, the recording exposure condition is optimized over the entire surface of the disk-shaped information carrier 1.

FIG. 7 shows a block diagram of one embodiment of the present invention in which the recording laser power is controlled by the address signal of the guide track. The like numerals and symbols to those shown in FIGS. 1–6 denote elements or units of like functions.

The laser light beam source 3 may be a semiconductor laser which osscilates at a low output power. The small spot light 103 tracks the guide track and the light reflected from an address recording point of the information carrier 1 is focused onto the light detector 17 as the light beam 105. The photo-electric converted signals $S_A$–$S_D$ are applied to a signal separation circuit 34 which separates the tracking error signal $S_t$ and the address signal $S_I$ of the information region 18. The signal separation circuit 34 is shown in detail in FIG. 5. The address signal $S_I$ may be a pulse encoding modulated (PE) or modified FM modulated (MFM) coded signal and it is demodulated in an address signal reproducing circuit 36 by a clock supplied from a clock reproducing circuit 37. The demodulated serial address signal a is supplied to a serial-to-parallel conversion circuit 38. The deseriallized address signal is applied to a D/A conversion circuit 39 where it is converted to an analog signal, which is then applied to a laser drive circuit 35 through a bias switching circuit 40, to control a bias current of the semiconductor laser. The D/A conversion output e of the D/A conversion circuit 39 is used only during the recording mode, and a reproducing bias output f of a reproducing bias circuit 43 is used in the reproducing mode. This switching is effected by the bias switching circuit 40. The switching of the bias current of the semiconductor laser between the recording mode and the reproducing mode is necessary in order to increase the laser output in the recording mode to record the information on the recording media and decrease the reproducing laser output in the reproducing mode to prevent the break of the recorded information by the exposure of the reproducing laser beam to the recording media.

Figure 8:
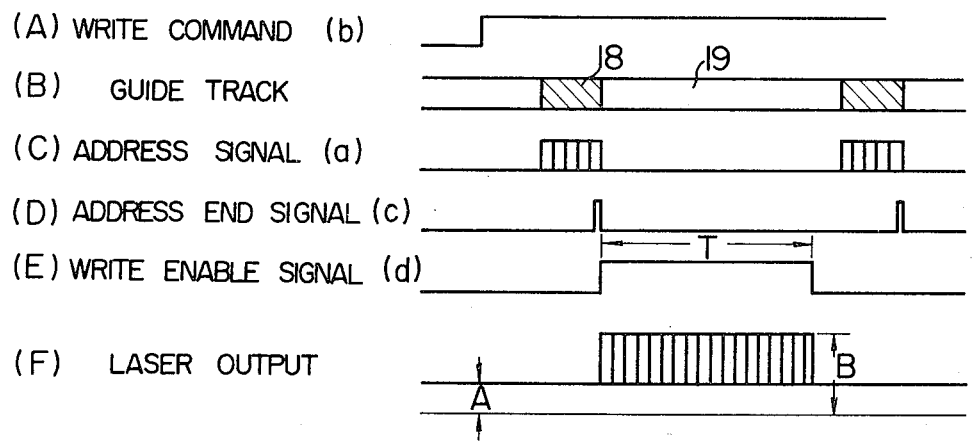
FIG. 8 shows a timing chart in recording information on the guide track.

FIG. 8 shows a control timing of the laser output in the recording and reproducing modes. A write command signal (b) and an address end signal (c) which indicates the end of an address signal (a) and ANDed by a gate 42, an AND output thereof is used to activate a timer 41. A write enable signal (d) at the output of the timer 41 falls after a time period T has elapsed. The time period T corresponds to a recording time. The write enable signal (d) controls which of the reproducing bias output (f) and the D/A converter output (e) be supplied as the bias of the laser drive circuit 35 by the bias switching circuit 40. When the write enable signal (d) is "1", the laser output is high to enable recording. FIG. 8(F) shows a laser output level. An output level A represents the laser output in the reproducing mode and an output level B represents the laser output in the recording mode.

Figure 9:
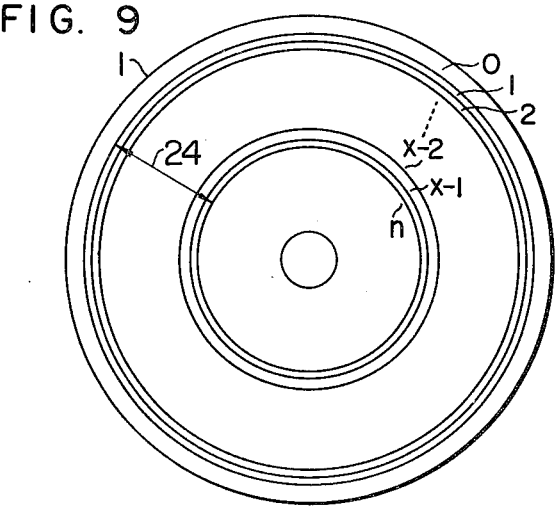
FIG. 9 shows addressing scheme on the guide track of the disk.

The high output level B is controlled by the address signal so that it corresponds to the recording laser power shown in FIG. 6. Since the control is effected by the address signal reproduced from the guide track, it will be convenient as shown in FIG. 9 for example if the address number sequentially increases as it goes from the outer periphery to the inner periphery of the disk. In FIG. 9, the recording laser power is optimized by controlling the bias current of the semiconductor laser in inverse proportion to the reproduced address signal.

Figure 10:
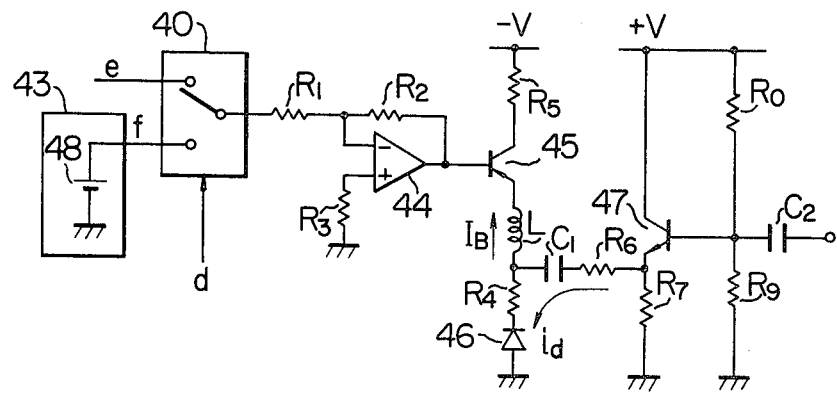
FIG. 10 shows a circuit diagram of a laser power control circuit.

FIG. 10 shows a laser power control circuit which varies the output of the semiconductor laser in accordance with the bias current thereof. Numeral 44 denotes an amplifier, numeral 45 denotes a PNP transistor, numeral 46 denotes a semiconductor laser and numeral 47 denotes an NPN transistor. $R_1$–$R_9$ denotes resistors, $C_1$ and $C_2$ denote capacitors and L denotes an inductor. A D.C. bias current $I_B$ of the semiconductor laser 46 is controlled by the transistor 45 and a modulating signal is current-amplified by the transistor 47 to produce a drive current id, which is supplied to the semiconductor laser 46. The inductor L serves to prevent the high frequency drive current id from biasing the transistor 45. The D.C. bias current $I_B$ changes in proportion to the base voltage of the transistor 45. The reproducing bias circuit 43 produces the reproducing bias output (f) by a reference voltage source 48. The bias switching circuit 40, the D/A converted output (e) and the write enable signal (d) have been explained in FIG. 7. The output of the bias switching circuit 40 is current-amplified by the amplifier 44, an output of which is applied to the base of the bias controlling transistor 45. As the D/A converted output (e) increases, the potential of the transistors 45 falls so that the D.C. bias current $I_B$ of the semiconductor laser 46 increases. Accordingly, when the address number is given as shown in FIG. 9, the polarity of the D/A converted output (e) is negative (that is, as the address number increases, the bias current decreases).

Figure 11:
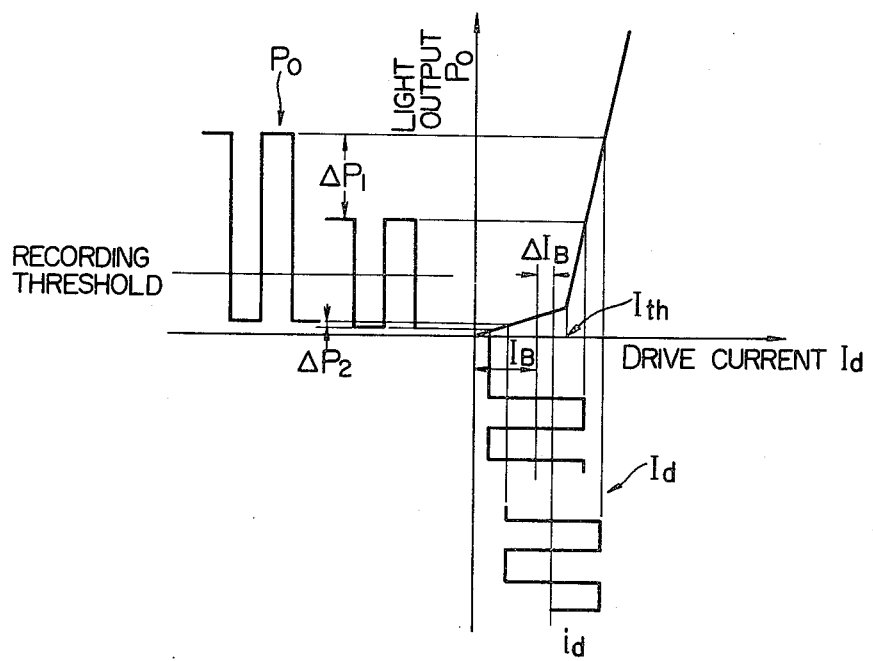
FIG. 11 shows a light output characteristic of a semiconductor laser.

FIG. 11 illustrates a principle of the increase and decrease of the light output $P_o$ of the semiconductor laser by the bias current $I_B$. Since the light output of the semiconductor laser versus the current characteristic curve changes very sharply when the current exceeds a threshold Ith, an increment $\Delta P_1$ of the light output for an increment $\Delta I_B$ of the bias current $I_O$ is large but an increment $\Delta P_2$ of the light output for the increment of the bias current $I_B$ can be made very small. Thus, by changing the D.C. bias current $I_B$ slightly with the drive current being fixed for the modulating signal, a peak value of the light output can be largely changed without reducing a contrast ratio of the light output.

It may be possible to control the light output by changing the drive current id for the modulating signal with the D.C. bias current of the semiconductor laser being fixed, but it is much easier to change the D.C. bias current because the modulating signal is the high frequency signal.

As is apparent from the above description, in accordance with the present invention, the track address signal prerecorded on the guide track is read out and the light output of the laser light source is controlled by the read-out address signal so that the change in the recording laser power due to a difference of circumferential speed of the information carrier between the inner periphery and the outer periphery thereof can be precisely and properly corrected. By giving the address of the guide track of the information carrier such that the address number sequentially increments as it goes from the outer periphery to the inner periphery, the D/A converted address signal can be directly used to control the bias current of the semiconductor laser.

By controlling the recording laser power by the bias current of the semiconductor laser, the circuit is simplified and the control of the bias current by the address signal is facilitated.

We claim:

1. An optical information recording and reproducing apparatus comprising:

a disk-shaped information carrier having a guide track on an information recording surface, said guide track having a serial digital address signal sequentially changing in a predetermined sequence prerecorded thereon, a laser light source for emitting a light beam for recording and reproducing information on and from said information carrier, an optical system for focusing said light beam on said information carrier as a small spot light, servo control means for causing said small light spot to track along and focus on said guide track of said information carrier, means for reading said serial digital address signal prerecorded on said guide track, means for converting said serial digital address signal to a parallel digital address signal, means for converting said parallel digital address signal to an analog address signal, means for generating a control gate signal upon detection of an address signal on a said guide track, means for controlling the intensity of the recording light beam of said laser light source by said analog address signal at predetermined times as determined by said control gate signal.

2. An optical information recording and reproducing apparatus according to claim 1 wherein said laser light source is a semiconductor laser and said means for controlling the intensity of said recording light beam controls said intensity by controlling a D.C. bias current of said semiconductor laser.

* * * * *